(12) United States Patent
Solano et al.

(10) Patent No.: US 10,851,747 B2
(45) Date of Patent: Dec. 1, 2020

(54) MOUNTING STRUCTURE OF FUEL DEVICE

(71) Applicant: TOYODA GOSEI CO., LTD., Kiyosu (JP)

(72) Inventors: Ismael Solano, Troy, MI (US); Kenta Kuwayama, Troy, MI (US); Steven Yurgalonis, Troy, MI (US)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 127 days.

(21) Appl. No.: 16/043,220

(22) Filed: Jul. 24, 2018

(65) Prior Publication Data
US 2020/0032748 A1 Jan. 30, 2020

(51) Int. Cl.
*F02M 37/00* (2006.01)
*F02M 25/08* (2006.01)
*F16K 21/18* (2006.01)
*F16K 24/04* (2006.01)
*F16K 27/00* (2006.01)
*F16K 27/02* (2006.01)
*F16K 31/22* (2006.01)
*F16K 27/10* (2006.01)
(Continued)

(52) U.S. Cl.
CPC ........ *F02M 37/0023* (2013.01); *F02M 25/08* (2013.01); *F16K 21/18* (2013.01); *F16K 24/042* (2013.01); *F16K 24/044* (2013.01); *F16K 27/00* (2013.01); *F16K 27/02* (2013.01); *F16K 27/0281* (2013.01); *F16K 27/102* (2013.01); *F16K 31/22* (2013.01); *B60K 15/077* (2013.01); *B60K 2015/0344* (2013.01); *B60K 2015/0775* (2013.01); *B60K 2015/0777* (2013.01); *Y10T 137/0874* (2015.04); *Y10T 137/0898* (2015.04); *Y10T 137/3099* (2015.04); *Y10T 137/85938* (2015.04); *Y10T 137/86324* (2015.04); *Y10T 137/86332* (2015.04)

(58) Field of Classification Search
CPC .......... B60K 15/077; B60K 2015/0344; B60K 2015/0775; B60K 2015/0777; F02M 25/08; F02M 37/0023; F16K 21/18; F16K 24/042; F16K 24/044; F16K 27/00; F16K 27/02; F16K 27/0281; F16K 27/102; F16K 31/22; Y10T 137/0874; Y10T 137/0898; Y10T 137/3099; Y10T 137/85938; Y10T 137/86324; Y10T 137/86332
USPC ...................... 137/43, 44; 220/563
See application file for complete search history.

(56) References Cited

U.S. PATENT DOCUMENTS 5,960,816 A * 10/1999 Mills ................ B60K 15/03519
137/202
6,035,884 A * 3/2000 King ................ B60K 15/03519
137/202
(Continued)

FOREIGN PATENT DOCUMENTS

JP 2006-264372 A 10/2006
JP 2014-525874 A 10/2014

Primary Examiner — Matthew W Jellett
(74) Attorney, Agent, or Firm — Posz Law Group, PLC

(57) ABSTRACT

The mounting structure of a fuel device is for mounting the fuel device, which includes a plurality of components, on a baffle plate for suppressing waving of liquid fuel stored in a fuel tank. One of the components of the fuel device is integrally formed, as a mounting portion, with the baffle plate. The remaining components of the fuel device are mounted, as a mounted portion, on the mounting portion of the baffle plate.

6 Claims, 9 Drawing Sheets

(51) Int. Cl.
*B60K 15/077* (2006.01)
*B60K 15/03* (2006.01)

(56) References Cited

U.S. PATENT DOCUMENTS

| | | | | |
|---|---|---|---|---|
| 6,311,675 | B2* | 11/2001 | Crary | B60K 15/03519 |
| | | | | 123/516 |
| 6,634,341 | B2* | 10/2003 | Crary | B60K 15/035 |
| | | | | 123/516 |
| 6,655,403 | B2* | 12/2003 | Mills | B60K 15/03519 |
| | | | | 137/2 |
| 7,147,017 | B2* | 12/2006 | Leonhardt | F16K 24/044 |
| | | | | 141/198 |
| 9,168,830 | B2* | 10/2015 | Park | B60K 15/077 |
| 9,783,044 | B2* | 10/2017 | Gebert | B60K 15/03177 |
| 9,827,851 | B2* | 11/2017 | Nagasaku | B60K 15/077 |
| 9,919,595 | B2* | 3/2018 | Diestelhorst | B29C 48/0017 |
| 10,279,679 | B2* | 5/2019 | Wada | B60K 15/035 |
| 10,369,882 | B2* | 8/2019 | Mihara | F02M 37/0023 |
| 2003/0089405 | A1* | 5/2003 | Mills | B60K 15/03519 |
| | | | | 137/587 |
| 2014/0238515 | A1 | 8/2014 | Thirlaway et al. | |
| 2017/0232834 | A1* | 8/2017 | Diestelhorst | B60K 15/03177 |
| | | | | 220/563 |
| 2019/0126745 | A1* | 5/2019 | Amano | B60K 15/077 |

* cited by examiner

MOUNTING STRUCTURE OF FUEL DEVICE

BACKGROUND OF THE INVENTION

The present invention relates to a mounting structure of a fuel device for mounting the fuel device, which includes multiple components, on a baffle plate for suppressing waving of liquid fuel stored in a fuel tank.

In automobiles, a baffle plate for suppressing waving of liquid fuel is arranged within a fuel tank in which liquid fuel is stored. In addition, a fuel device including a plurality of components is arranged in the fuel tank. Examples of the fuel device include a full-tank detection valve for detecting a full tank and a fuel shut-off valve such as a cutoff valve for preventing a fuel leak upon oscillation.

When the baffle plate and the fuel device are mounted in the fuel tank, first, a holding unit (attachment) is mounted in the fuel tank. Then, the baffle plate and the fuel device are mounted on the holding unit. This complicates the mounting work and poses a problem in terms of the efficiency of the mounting work.

In view of this, Japanese Laid-Open Patent Publication No. 2006-264372 discloses a technique of arranging the holding unit on the baffle plate in an integrated manner and mounting the fuel device on the holding unit. This technique improves the efficiency of the mounting work by eliminating the need for mounting the holding unit in the fuel tank in which the fuel device is mounted on the holding unit.

However, in the above publication, in order to mount the fuel device on the baffle plate, it is necessary to mount the fuel device on the holding unit arranged on the baffle plate. This leaves room for improvement despite the improvement of the efficiency of the mounting work.

SUMMARY OF THE INVENTION

It is an objective of the present invention to provide a mounting structure of a fuel device that further improves efficiency when the device is mounted on the baffle plate.

The mounting structure of a fuel device that solves the above-mentioned problem is for mounting the fuel device, which includes a plurality of components, on a baffle plate for suppressing waving of liquid fuel stored in a fuel tank. One of the components of the fuel device is integrally formed, as a mounting portion, with the baffle plate. The remaining components of the fuel device are mounted, as a mounted portion, on the mounting portion of the baffle plate.

DETAILED DESCRIPTION OF THE PREFERRED EMBODIMENTS

First Embodiment

In the following, a mounting structure of a fuel device according to a first embodiment will be described with reference to FIGS. 1 to 5.

In automobiles, a fuel tank for storing liquid fuel is installed. In proximity to the fuel tank, a vaporized fuel circulating system referred to as an evaporation circuit is arranged. The evaporation circuit guides vaporized fuel from the fuel tank to the external canister and allows activated carbon or the like to adsorb the vaporized fuel for temporary storage, thereby preventing an increase in the inner pressure of the fuel tank resulting from a rise of vapor pressure. The canister is connected to the intake passage of the engine. The canister allows the activated carbon to discharge vaporized fuel due to negative pressure of suction air of the engine and also allows the vaporized fuel to be mixed with a mixture of fuel and air, so that the vaporized fuel that has been adsorbed may be used as fuel.

Figure 5:
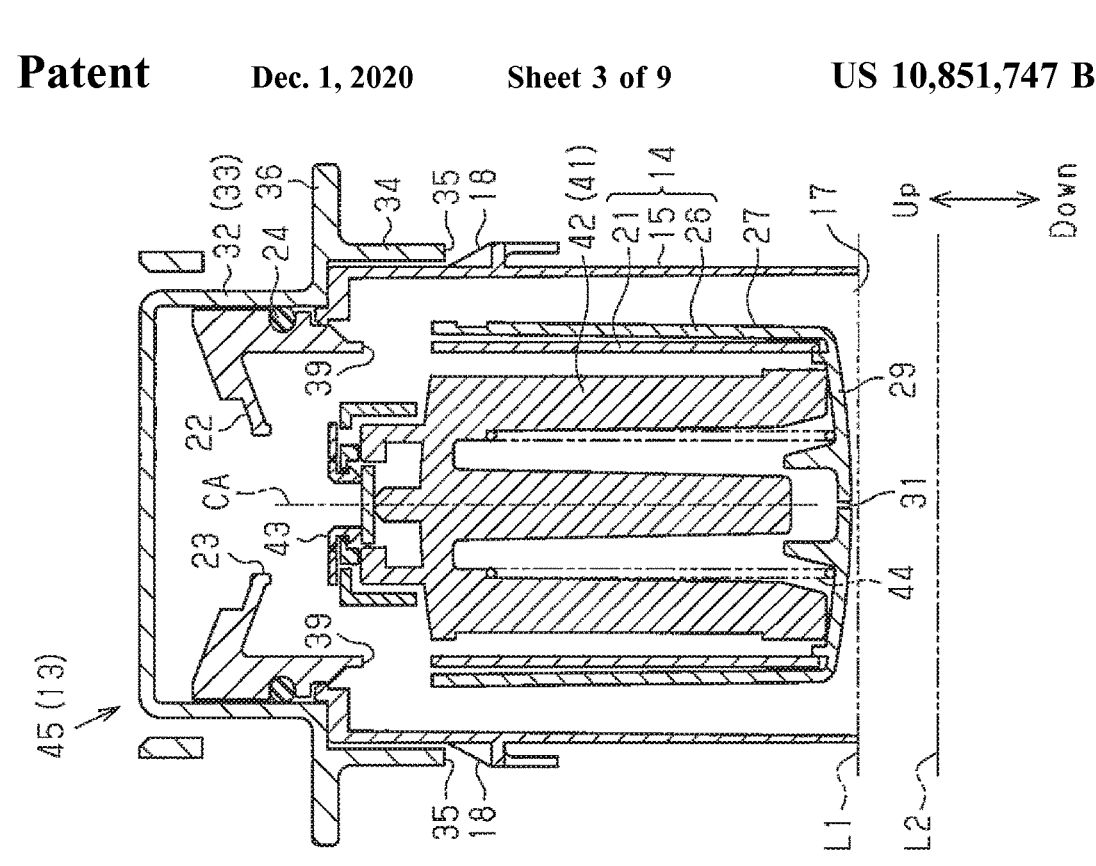
FIG. 5 is a cross-sectional view taken along line 5-5 in FIG. 1.
Figure 4:
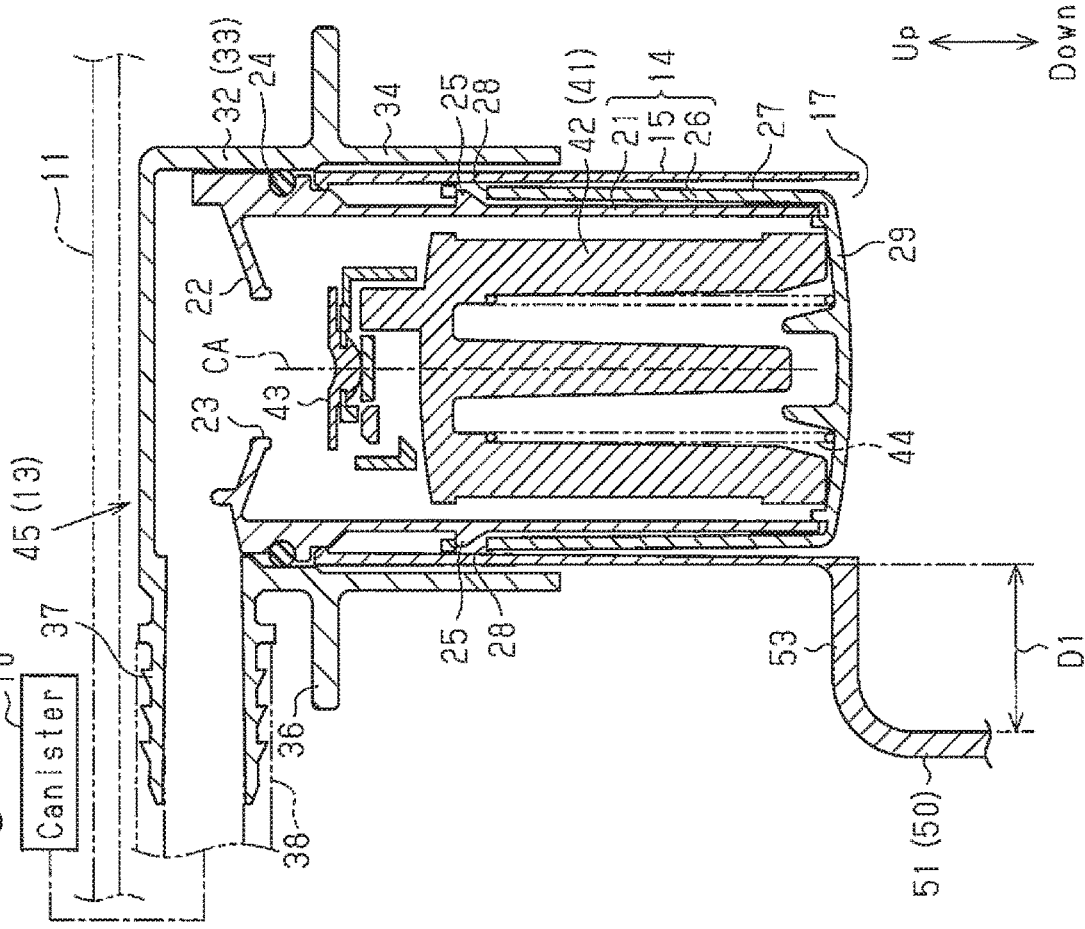
FIG. 4 is a cross-sectional view taken along line 4-4 in FIG. 1.

FIGS. 4 and 5 show a place to which the mounting structure of a fuel device is applied. A baffle plate 50 and a fuel shut-off valve 13 serving as the fuel device are arranged within a fuel tank 11.

The fuel shut-off valve 13 according to a first embodiment has a function of a full-tank detection valve for detecting the full-tank state during refueling. The fuel shut-off valve 13 also has a function of a cutoff valve for preventing liquid fuel from flowing into the above evaporation circuit while driving or the like.

The fuel shut-off valve 13 includes a housing 14, a cover 32, a float valve 41, and a spring 44. The housing 14 includes an outer housing member 15, an intermediate housing member 26, and an inner housing member 21. The above components of the housing 14 are all made of a plastic material.

Figure 2:
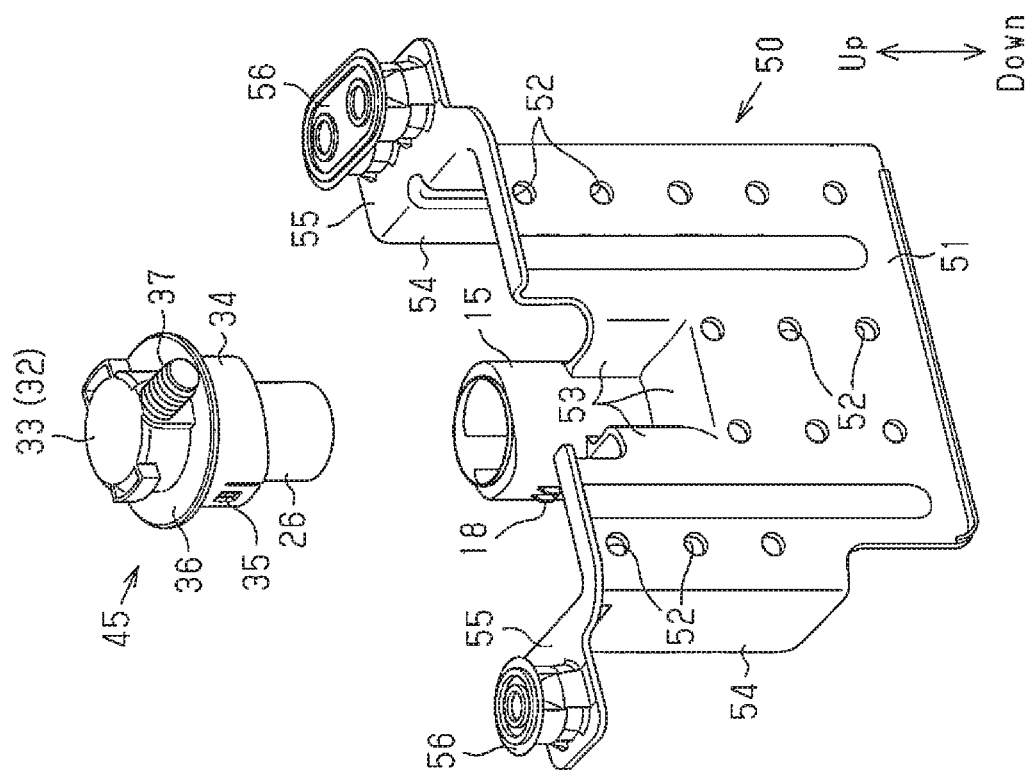
FIG. 2 is an exploded perspective view illustrating a state before the mounted portion of the fuel shut-off valve is mounted on the mounting portion of the baffle plate according to the first embodiment.
Figure 3:
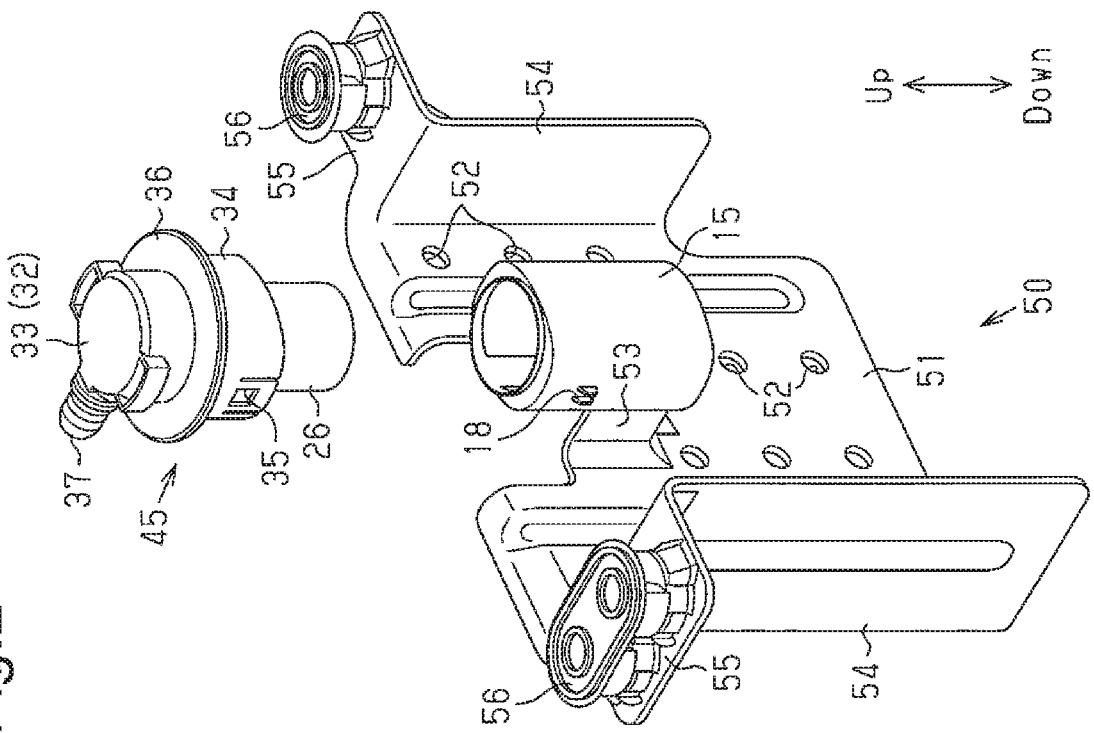
FIG. 3 is an exploded perspective view illustrating the state of FIG. 2 seen from the opposite side in the thickness direction of a wall body in FIG. 2.

The outer housing member 15 has a tubular shape, which extends in the vertical direction and includes open upper and lower ends. The outer housing member 15 includes a lower opening 17 at the lower end. A plurality of engaging portions is formed on the outer circumference of the outer housing member 15. The engaging portions are spaced from each other in the circumferential direction. Each engaging portion is formed by an engaging protrusion 18 protruding from the circumferential surface of the outer housing member 15 outward in the radial direction as shown in FIGS. 2, 3, and 5. The height position of the lower opening 17 of the outer housing member 15 is set to be substantially the same height position as a liquid level L1 of liquid fuel when the fuel tank 11 is full.

As shown in FIGS. 4 and 5, the inner housing member 21 has a tubular shape, which extends in the vertical direction and includes open upper and lower ends. A large portion of the inner housing member 21 except an upper portion thereof is arranged within the outer housing member 15. The upper portion of the inner housing member 21 is placed on the upper brim of the outer housing member 15. The upper end of the inner housing member 21 includes a tapered upper wall 22 inclined downward as it approaches the center axis CA of the inner housing member 21. A communication opening 23 in communication with the canister 10 is provided at the central portion of the upper wall 22. The inside and the outside of the inner housing member 21 are in communication via the communication opening 23. An O-ring 24 is attached to the outer circumference in the upper portion of the inner housing member 21. A plurality of locking claws 25 protrudes from the circumferential surface of the inner housing member 21 outward in the radial direction. These locking claws 25 are located lower than the O-ring 24 and are spaced from each other in the circumferential direction.

The intermediate housing member 26 includes a tubular portion 27 and a bottom 29. The tubular portion 27 has a tubular shape, which extends in the vertical direction and includes an open upper end. The tubular portion 27 is arranged between the outer housing member 15 and the inner housing member 21. A plurality of locking holes 28, each of which extends through the tubular portion 27 in the radial direction, is provided on the upper end of the tubular portion 27. These locking holes 28 are spaced from each other in the circumferential direction. The bottom 29 is formed at the lower end of the tubular portion 27 and closes the lower end of the tubular portion 27. A communication hole 31, which extends through the bottom 29 in the vertical direction, is provided on the bottom 29. The inside and the outside of the intermediate housing member 26 are in communication via the communication hole 31. Each of the locking holes 28 is engaged with the corresponding one of the locking claws 25, such that the intermediate housing member 26 is attached to the inner housing member 21.

The cover 32 is made of a plastic material and includes an upper tubular portion 33, a lower tubular portion 34, a flange 36, and a nipple 37. The upper tubular portion 33 has a tubular shape, which extends in the vertical direction and includes a closed upper end. The lower tubular portion 34 has a tubular shape, which includes open upper and lower ends. The lower tubular portion 34 includes a plurality of engaged portions. These engaged portions are spaced from each other in the circumferential direction of the lower tubular portion 34. Each of the engaged portions is formed with an engaging hole 35, which extends through the lower tubular portion 34 in the radial direction. The flange 36 is formed on the boundary between the upper tubular portion 33 and the lower tubular portion 34. The nipple 37 extends outward in the radial direction from the upper tubular portion 33.

The canister 10 and the fuel shut-off valve 13 are connected to each other by a tube 38. One end of the tube 38 covers the nipple 37.

The cover 32 covers the upper half of the housing 14 from above. The inner circumferential surface of the upper tubular portion 33 is in close contact with the above O-ring 24. This O-ring 24 maintains the airtightness between the inner housing member 21 and the upper tubular portion 33. Further, each of the engaging holes 35 is engaged with the corresponding one of the engaging protrusions 18, such that the cover 32 is attached to the outer housing member 15.

A plurality of through-holes 39 is provided on the upper portion of the inner housing member 21. Further, in each of the lower tubular portion 34 of the cover 32 and the outer housing member 15, a through-hole (not shown) is provided on a place corresponding to the top portion of the fuel tank 11. The inside of the inner housing member 21 and the gaseous phase part of the fuel tank 11 are in communication via these through-holes 39 and the through-holes (not shown).

The float valve 41 includes a float 42 and a valve seat 43. The float 42 is vertically movably arranged within the inner housing member 21. The valve seat 43 is attached to the upper end of the float 42. In addition, the valve seat 43 may be formed by a part of the float 42. The float valve 41 is configured to close the communication opening 23 when the float 42 rises in accordance with a rise of the liquid surface of liquid fuel and the valve seat 43 abuts on the upper wall 22 from below.

The spring 44 is arranged between the float 42 and the bottom 29 of the intermediate housing member 26 while maintaining biasing force generated by being pressed. Since this biasing force is smaller than the weight of the float valve 41, in the atmosphere and vaporized fuel, the weight of the float 42 presses the spring 44 and the lower end surface of the float 42 abuts on the bottom 29.

Figure 1:
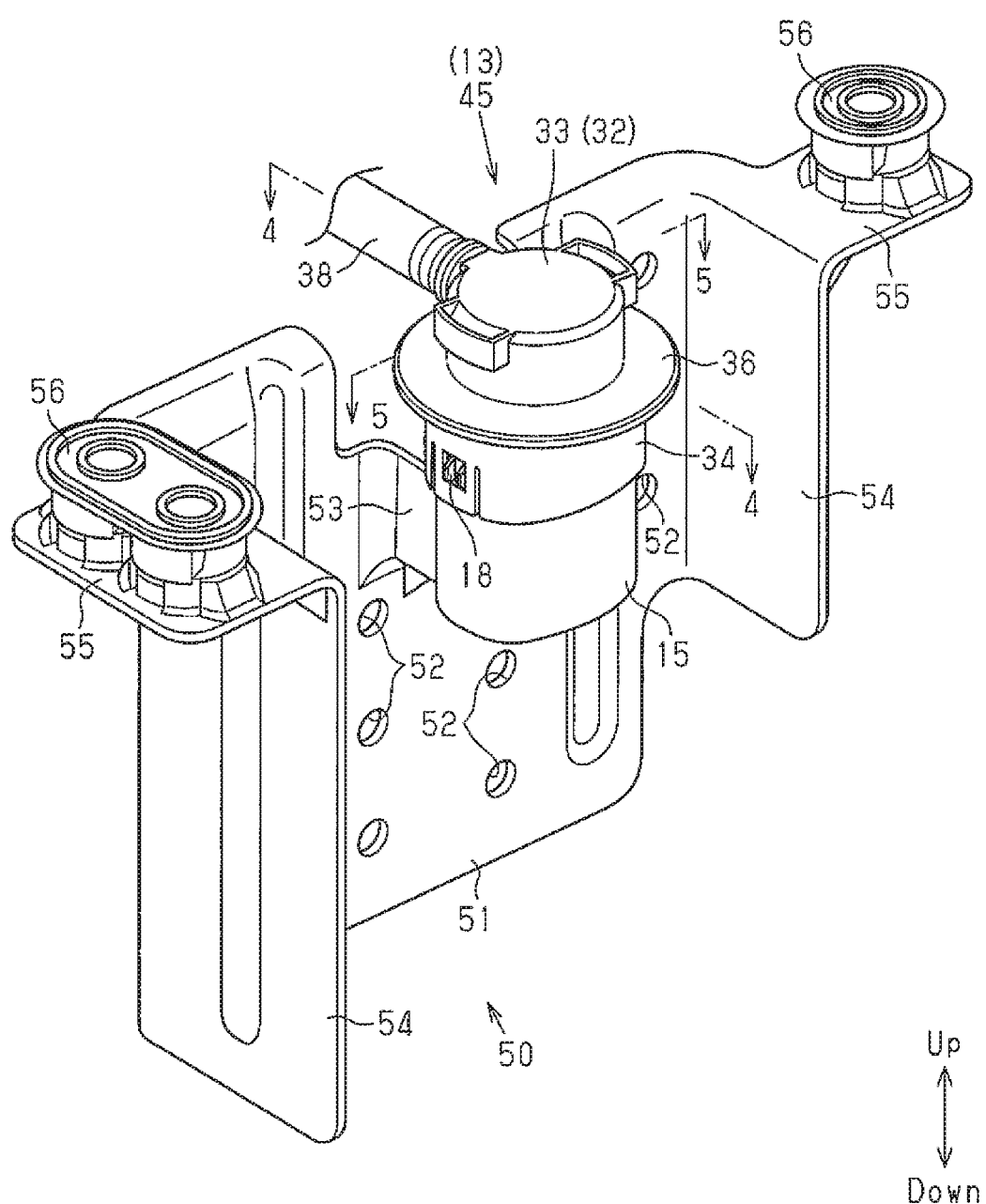
FIG. 1 is a partial perspective view illustrating a state in which a mounted portion of a fuel shut-off valve is mounted on a mounting portion (outer housing member) of a baffle plate according to a first embodiment.

The baffle plate 50 is made of a plastic material and includes a body wall 51, the above outer housing member 15 of the fuel shut-off valve 13, a connector 53, two side walls 54, and an upper wall 55 of the respective side wall 54 as shown in FIGS. 1 to 3.

The body wall 51 constitutes a main portion of the baffle plate 50 and has a flat shape that extends in the vertical direction. The body wall 51 has holes 52, which extend through the body wall 51 in the thickness direction thereof. The outer housing member 15 of the fuel shut-off valve 13 is integrally formed, as a mounting portion, with the baffle plate 50 on the body wall 51. As shown in FIG. 4, the outer housing member 15 is spaced from the body wall 51 as much as a distance D1 in the thickness direction of the body wall 51. The distance D1 is preferably set to 5 mm or more.

As shown in FIGS. 2 and 3, the connector 53 protrudes from the body wall 51 toward the outer housing member 15 and is coupled to the outer housing member 15. The connector 53 connects the outer housing member 15 to the body wall 51.

Each of the side walls 54 extends from the body wall 51 so as to face the outer housing member 15. The side walls 54 are located such that the outer housing member 15 is arranged therebetween. The side walls 54 are spaced from the outer housing member 15. This structure surrounds the outer housing member 15 by the side walls 54 and the body wall 51 on three sides.

Each of the upper walls 55 is formed to protrude away from the outer housing member 15 from the upper end of the corresponding side wall 54. Each upper wall 55 has an attachment seat 56. The baffle plate 50 is fixed to the upper portion of the fuel tank 11 by welding or the like on the attachment seats 56.

The following describes the operations and advantages of the first embodiment in the above configuration.

The outer housing member 15, which is one of the components of the fuel shut-off valve 13, is integrally formed with the baffle plate 50 to serve as a mounting portion. In other words, the baffle plate 50 includes the outer housing member 15, which is one of the components of the fuel shut-off valve 13, as a part of itself.

With this structure, when the fuel shut-off valve 13 is mounted on the baffle plate 50, the remaining components of the fuel shut-off valve 13 are mounted as a mounted portion 45 on the outer housing member 15 (mounting portion) of the baffle plate 50. More specifically, the mounted portion 45 is formed by mounting the inner housing member 21, the intermediate housing member 26, the float valve 41, and the spring 44 on the cover 32 in advance. This mounted portion 45 is arranged above the outer housing member 15 (mounting portion). The position of the mounted portion 45 in the circumferential direction is adjusted such that the direction in which the nipple 37 extends matches the thickness direction of the body wall 51 in which the nipple 37 approaches the body wall 51. With this positional adjustment, the engaging holes 35 in the lower tubular portion 34 are positioned above the engaging protrusions 18 in the outer housing member 15 (mounting portion). In this state, the mounted portion 45 is lowered, such that the intermediate housing member 26 is inserted into the outer housing member 15 and the lower tubular portion 34 of the cover 32 covers the upper portion of the outer housing member 15 from the outside. The outer housing member 15 is held by the tubular portion 27 of the intermediate housing member 26 and the lower tubular portion 34 of the cover 32. As the mounted portion 45 lowers, each of the engaging holes 35 approaches the corresponding one of the engaging protrusions 18. Then, when the mounted portion 45 lowers to the position where each engaging hole 35 has substantially the same height position as the corresponding engaging protrusion 18, each engaging hole 35 is engaged with the corresponding engaging protrusion 18. With this engagement, the mounted portion 45 is mounted on the outer housing member 15 (mounting portion). The fuel shut-off valve 13 is assembled by integrating the mounted portion 45 with the outer housing member 15.

In this manner, the assembling of the fuel shut-off valve 13 and the coupling of the fuel shut-off valve 13 to the baffle plate 50 are performed at the same time.

In the first embodiment, the outer housing member 15, which is one of the components of the fuel shut-off valve 13, is integrally formed with the body wall 51 as a part of the baffle plate 50. Thus, unlike Japanese Laid-Open Patent Publication No. 2006-264372, the first embodiment eliminates the mounting work of the fuel shut-off valve on the holding unit arranged on the baffle plate and further improves the efficiency of the overall mounting work accordingly as compared with the above publication.

Further, the holding unit (attachment) for mounting the fuel shut-off valve 13 on the baffle plate 50 is removed, so that the number of parts is reduced accordingly as compared with the above publication. Further, unlike the above publication, the possibility that the fuel device might come off the holding unit is eliminated.

The baffle plate 50 and the fuel shut-off valve 13 operate as follows.

As shown in FIGS. 4 and 5, in normal conditions, where the liquid surface of liquid fuel does not experience great fluctuation, when the liquid surface is positioned at a liquid level L2 lower than the liquid level L1, the weight of the float valve 41 is more than the biasing force of the spring 44, so that the valve seat 43 is positioned lower than the communication opening 23, thereby opening the communication opening 23.

With this structure, gas in the fuel tank 11 enters the inside of the outer housing member 15 through the through-hole (not shown) of the lower tubular portion 34, the through-hole (not shown) of the outer housing member 15, and the lower opening 17 of the outer housing member 15 as described above. This gas enters the inside of the inner housing member 21 through the through-holes 39. The gas flows into the canister 10 from the communication opening 23 through the nipple 37 and the tube 38. This flow prevents a rise in the gas pressure of the fuel tank 11.

By contrast, if the automobile runs on a road with great irregularities or runs on a curve (when the vehicle sways), the liquid fuel greatly waves. The liquid fuel enters the inside of the fuel shut-off valve 13 and is prevented from flowing into the canister 10. That is, the float 42 floats up in the liquid fuel and the valve seat 43 closes the communication opening 23, thereby functioning as a cutoff valve.

Further, when refueling using an oil-feeding gun, if the liquid surface of the liquid fuel in the fuel tank 11 is positioned at the liquid level L2, for example, which is lower than the liquid level L1, gas of the gaseous phase part in the fuel tank 11 flows from the lower opening 17 of the outer housing member 15 to the canister 10 in accordance with the rise of the liquid surface. This prevents the inner pressure of the fuel tank 11 from rising while continuously allowing the refueling.

During the refueling, when the liquid surface of the liquid fuel rises to the liquid level L1, namely, the lower opening 17 of the outer housing member 15, the communication of the gas of the gaseous phase part in the fuel tank 11 with the outside is shut off. Then the gas pressure in the fuel tank 11 rises to generate a pressure difference between the gaseous phase part of the fuel tank 11 and the gaseous phase part in the inner housing member 21, so that the liquid surface of the liquid fuel in the inner housing member 21 rises and becomes higher than the liquid surface of the liquid fuel in the fuel tank 11. The float 42 floats up accordingly and the valve seat 43 closes the communication opening 23, thereby shutting off gas communication. This shut-off rapidly increases the gas pressure in the fuel tank 11 and the full-tank state is detected to urge the oil-feeding gun to stop automatically. In other words, the fuel shut-off valve 13 detects that the fuel tank 11 is filled with liquid fuel when the gas pressure in the fuel tank 11 rises after the liquid surface of the liquid fuel in the fuel tank 11 reaches the lower opening 17 (liquid level L1) of the outer housing member 15.

As shown in FIGS. 1 to 3, the body wall 51 of the baffle plate 50 suppresses waving of liquid fuel by applying resistance to the liquid fuel when the liquid fuel stored in the fuel tank 11 passes through the holes 52.

The lower opening 17 of the outer housing member 15 in the fuel shut-off valve 13 has a part of the function of detecting a full tank as described above. In order to improve the accuracy of the detection of a full tank, it is important to stabilize the liquid surface of the liquid fuel.

In this regard, in the first embodiment, the outer housing member 15 is integrally formed with the baffle plate 50 while being in proximity to the body wall 51. This makes the suppressive effects on waving by the body wall 51 more likely to affect the outer housing member 15, so that the liquid surface of the liquid fuel is stabilized in the vicinity of the outer housing member 15. This structure detects a full tank with good accuracy in comparison with a case where the outer housing member 15 is arranged at a location far away from the body wall 51.

When the outer housing member 15 is too close to the body wall 51, even if the liquid surface of the liquid fuel is positioned at the liquid level L2 lower than the liquid level L1, the liquid fuel may rise in the gap between the outer housing member 15 and the body wall 51 by surface tension. In this case, the fuel that has risen may cause an erroneous detection of a full tank.

In view of this, in the first embodiment, the outer housing member 15 is spaced from the body wall 51 as much as 5 mm or more. This prevents the liquid fuel from rising in the gap between the outer housing member 15 and the body wall 51 by surface tension. The stabilization of the liquid surface of the liquid fuel prevents a false detection of a full tank resulting from a rise of the liquid surface by surface tension. The above effects will be exhibited when the vehicle is inclined, for example.

Further, as shown in FIG. 1, the baffle plate 50 includes the side walls 54 extending from the body wall 51 so as to face the outer housing member 15. The liquid surface is stable in the vicinity of the outer housing member 15 surrounded by the body wall 51 and the side walls 54. This feature also allows a full tank to be detected with good accuracy.

Further, in the first embodiment, two side walls 54 have the outer housing member 15 therebetween. This structure surrounds the outer housing member 15 by the body wall 51 and the side walls 54 on three sides. In the vicinity of the outer housing member 15, the liquid surface is more stable. This allows a full tank to be detected with better accuracy. In this manner, the first embodiment detects a full tank with good accuracy while reducing the influence of waving of the liquid surface.

Second Embodiment

Figure 6:
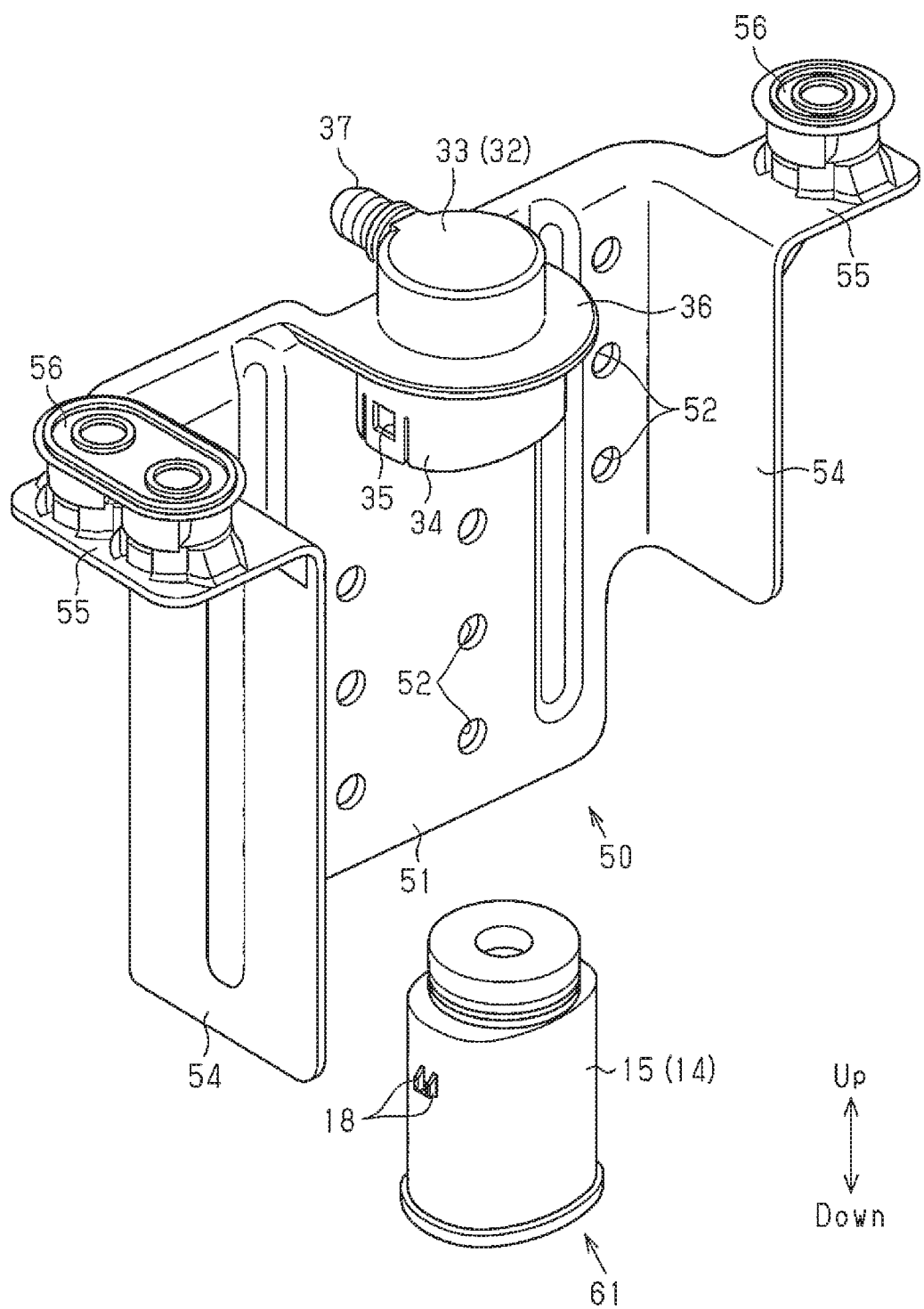
FIG. 6 is an exploded perspective view illustrating a state before a mounted portion of a fuel shut-off valve is mounted on a mounting portion (cover) of a baffle plate according to a second embodiment.

In the following, a second embodiment of the mounting structure of a fuel device will be described with reference to FIG. 6.

In the second embodiment, from the components of the fuel shut-off valve 13, the cover 32 is configured to be a mounting portion. This cover 32 is integrally formed, as a part of the baffle plate 50, with the baffle plate 50 on the body wall 51. At the flange 36, the cover 32 is connected to the body wall 51. The lower tubular portion 34 of the cover 32 is spaced from the body wall 51.

The remaining components of the fuel shut-off valve 13 are mounted as a mounted portion 61 on the cover 32 (mounting portion). The mounted portion 61 includes the above housing 14, the float valve 41, and the like.

The above mounting is made by engaging the plurality of engaging protrusions 18 formed on the outer housing member 15 of the mounted portion 61 with the engaging holes 35 provided on the lower tubular portion 34 of the cover 32 (mounting portion). The lower tubular portion 34 of the cover 32 is spaced from the body wall 51, so that the outer housing member 15 is spaced from the body wall 51 when the mounted portion 61 is mounted on the cover 32.

Other than the above-mentioned configuration, the second embodiment has the same structure as in the first embodiment. Identical reference numerals are given to the components described in the first embodiment and redundant description is omitted herein.

The second embodiment is different from the first embodiment in that among the components of the fuel shut-off valve 13, the cover 32 instead of the outer housing member 15 is the one that is integrally formed with the baffle plate 50. However, the second embodiment has a feature in common with the first embodiment in that the mounted portion 61 is mounted on the mounting portion (cover 32) integrally formed with the baffle plate 50. Thus, the second embodiment provides the same operations and advantages as the first embodiment.

Third Embodiment

Figure 7:
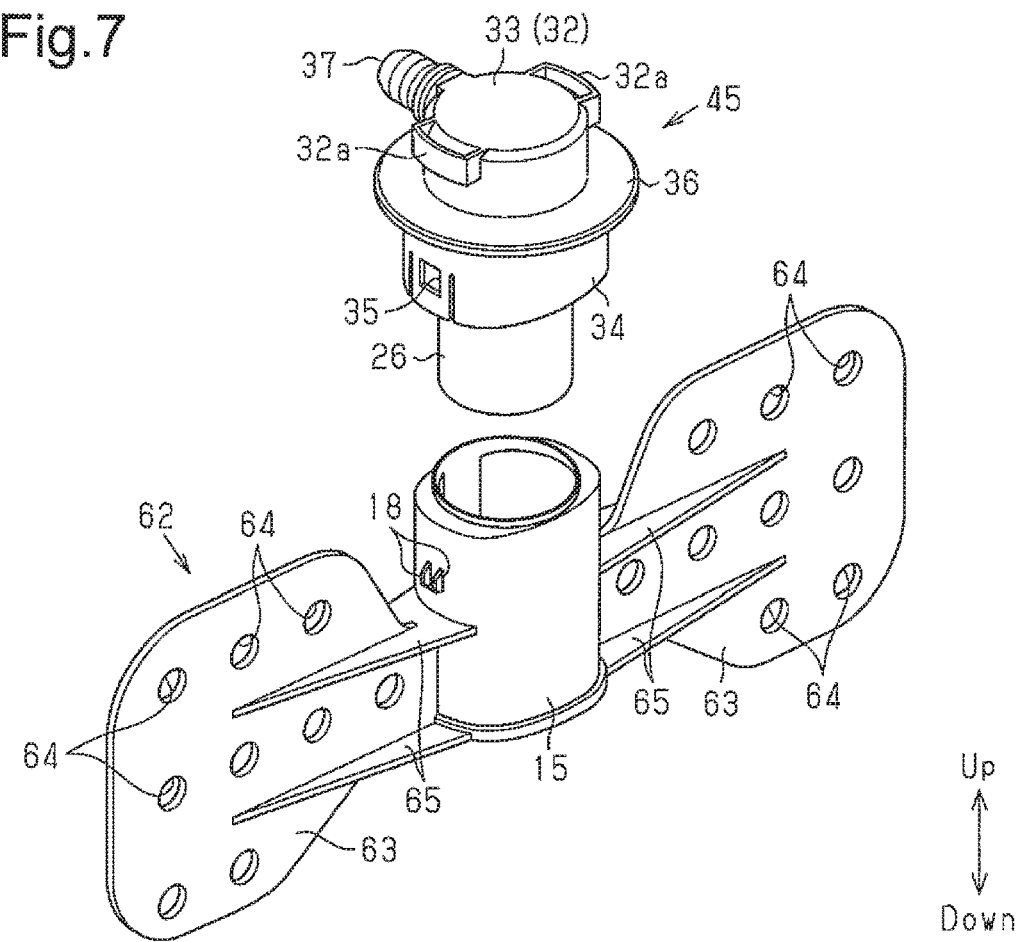
FIG. 7 is an exploded perspective view illustrating a state before a mounted portion of a fuel shut-off valve is mounted on a mounting portion (outer housing member) of a baffle plate according to a third embodiment.
Figure 8:
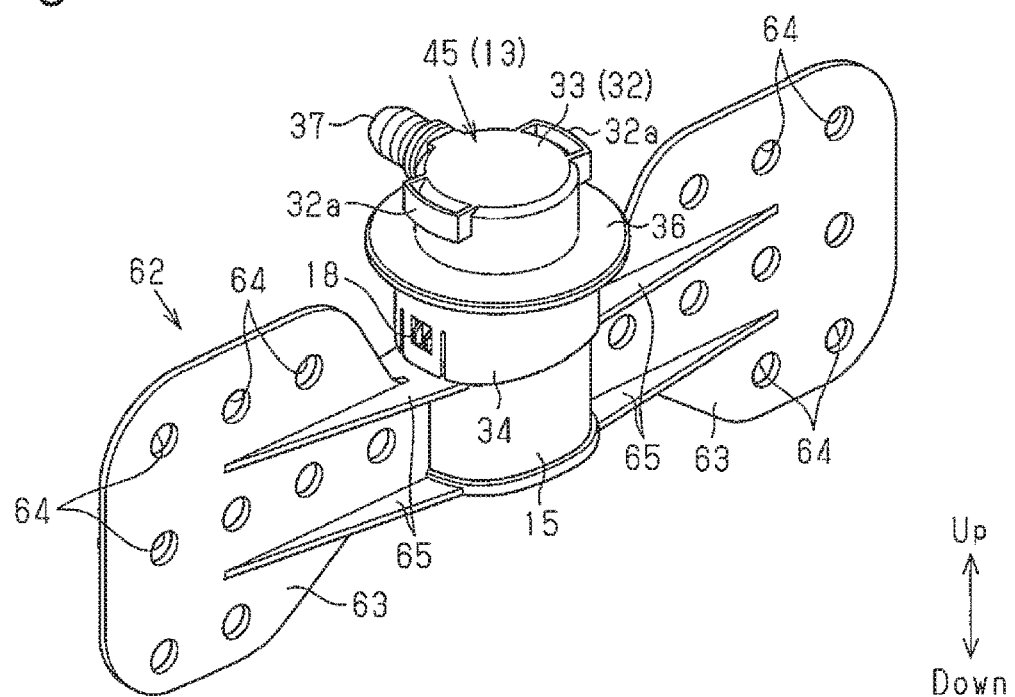
FIG. 8 is a perspective view illustrating a state in which the mounted portion of the fuel shut-off valve is mounted on the mounting portion (outer housing member) of the baffle plate according to the third embodiment.

In the following, a third embodiment of the mounting structure of a fuel device will be described with reference to FIGS. 7 and 8.

The third embodiment employs a baffle plate 62 having a shape different from the first embodiment. The baffle plate 62 includes the outer housing member 15, which serves as a mounting portion, and a pair of flat body walls 63 located such that the outer housing member 15 is arranged therebetween. The pair of the body walls 63 is arranged linearly in the radial direction of the outer housing member 15. Each of the body walls 63 has holes 64 extending through the body wall 63 in the thickness direction thereof. Each body wall 63 includes reinforcing ribs 65 spaced from each other in the vertical direction. Each of the reinforcing ribs 65 holds the corresponding one of the body walls 63 from the opposite sides in the thickness direction and is coupled to the outer housing member 15. In this manner, the outer housing member 15, which is one of the components of the fuel shut-off valve 13, is integrally formed with the baffle plate 62.

The remaining components of the fuel shut-off valve 13 are mounted as the mounted portion 45 on the outer housing member 15 (mounting portion) of the baffle plate 62. This mounting is made by engaging the engaging protrusions 18 formed on the outer housing member 15 with the engaging holes 35 provided on the cover 32 in the same manner as in the first embodiment. Further, the fuel shut-off valve 13 is mounted on the fuel tank 11 when fitting portions (not shown) formed on the fuel tank 11 are fitted into fitted portions 32a formed on the cover 32.

Other than the above-mentioned configuration, the third embodiment has the same structure as in the first embodiment. Identical reference numerals are given to the components described in the first embodiment and redundant description is omitted herein.

In the third embodiment, among the components of the fuel shut-off valve 13, the structure of the baffle plate 62, with which the outer housing member 15 (mounting portion) is integrally formed, is different from the structure of the baffle plate 50 in the first embodiment. However, the third embodiment has a feature in common with the first embodiment in that the mounted portion 45 of the fuel shut-off valve 13 is mounted on the outer housing member 15 (mounting portion). Thus, unlike Japanese Laid-Open Patent Publication No. 2006-264372, the third embodiment eliminates the mounting work of the fuel shut-off valve on the holding unit arranged on the baffle plate, thereby providing advantages of further improving the efficiency of the overall mounting work.

The third embodiment also provides advantages of stabilizing the liquid surface of liquid fuel and improving the accuracy of the detection of a full tank.

Fourth Embodiment

Figure 9:
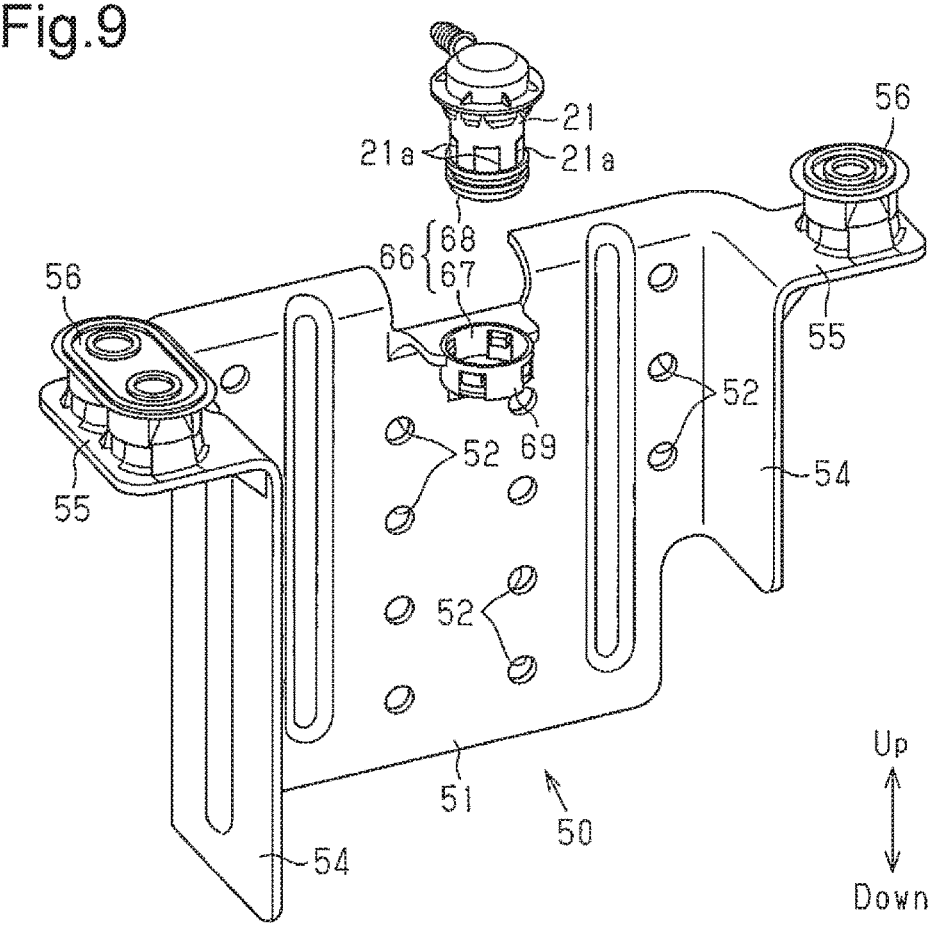
FIG. 9 is an exploded perspective view illustrating a state before a mounted portion of a fuel shut-off valve is mounted on a mounting portion of a baffle plate according to a fourth embodiment.
Figure 10:
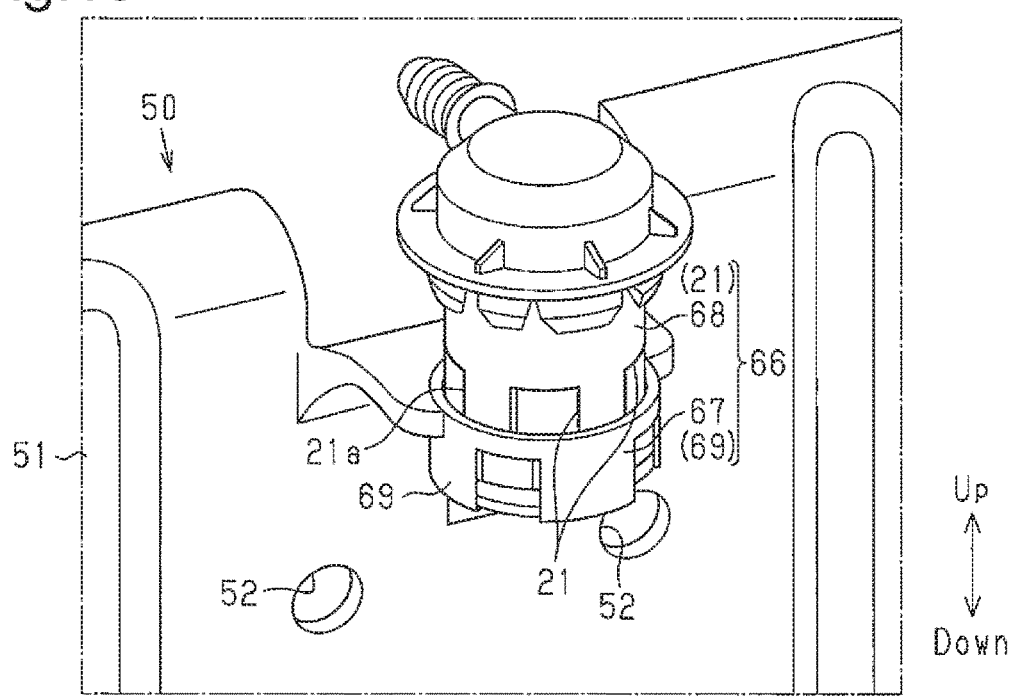
FIG. 10 is a partial perspective view illustrating a state in which the mounted portion of the fuel shut-off valve is mounted on the mounting portion of the baffle plate according to the fourth embodiment.

In the following, a fourth embodiment of the mounting structure of a fuel device will be described with reference to FIGS. 9 and 10.

The fourth embodiment employs a fuel shut-off valve 66 having a function of a cutoff valve as the fuel device.

One of the components of the fuel shut-off valve 66, more specifically, an integrated bottom 69 is integrally formed, as a mounting portion 67, with the baffle plate 50 on the body wall 51. The remaining components of the fuel shut-off valve 66 are mounted as a mounted portion 68 on the above mounting portion 67 of the baffle plate 50. This mounting may be made by engaging an engaging protrusion with an engaging hole in the same manner as in the first embodiment. The inner housing member 21 in the mounted portion 68 has an opening portion 21a Other than the above-mentioned configuration, the fourth embodiment has the same structure as in the first embodiment. Identical reference numerals are given to the components described in the first embodiment and redundant description is omitted herein.

In the fourth embodiment, the structure of the fuel shut-off valve 66 is different from the structure of the fuel shut-off valve 13 in the first embodiment. However, the fourth embodiment has a feature in common with the first embodiment in that the mounted portion 68 of the fuel shut-off valve 66 is mounted on the mounting portion 67 integrally formed with the baffle plate 50. Thus, unlike Japanese Laid-Open Patent Publication No. 2006-264372, the fourth embodiment eliminates the mounting work of the fuel shut-off valve on the holding unit arranged on the baffle plate, thereby providing advantages of further improving the efficiency of the overall mounting work. Moreover, the integrated bottom 69 in the fuel shut-off valve 66 is integrally formed with the baffle plate 50. This prevents liquid fuel from flowing into the fuel shut-off valve 66.

Fifth Embodiment

Figure 11:
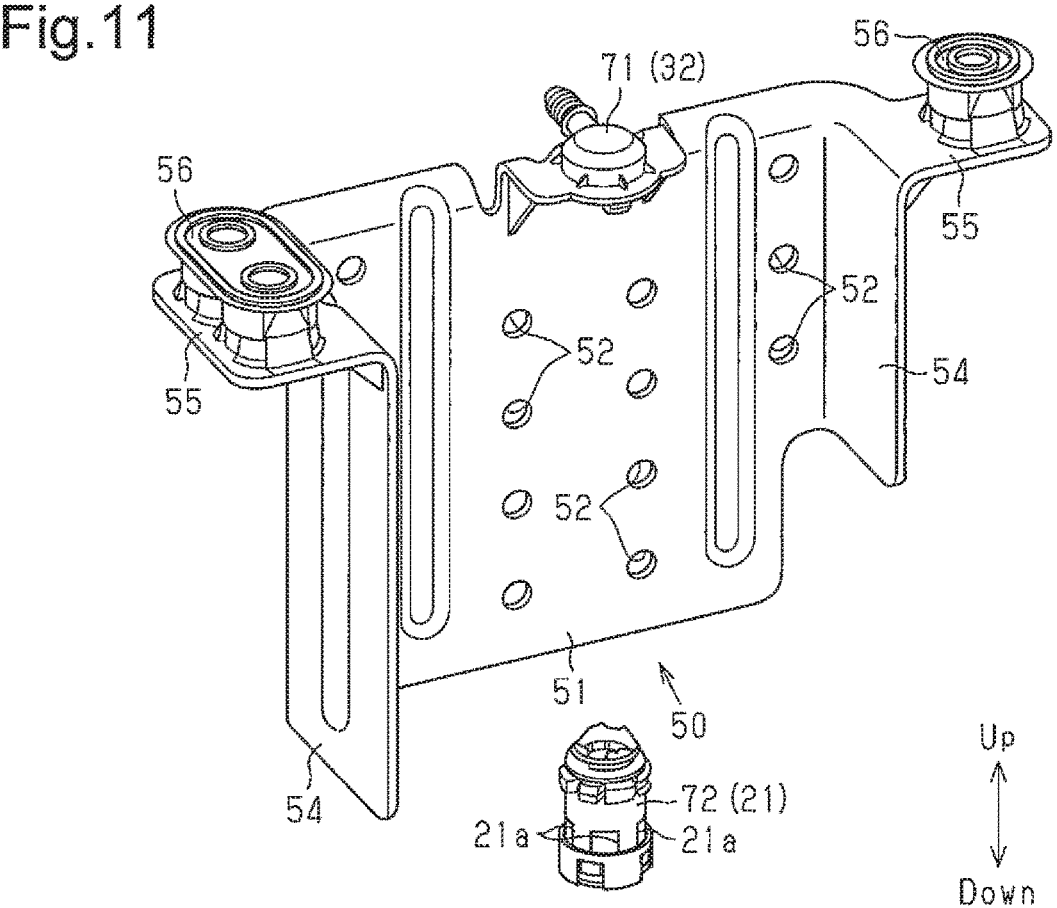
FIG. 11 is an exploded perspective view illustrating a state before a mounted portion of a fuel shut-off valve is mounted on a mounting portion of a baffle plate according to a fifth embodiment.
Figure 12:
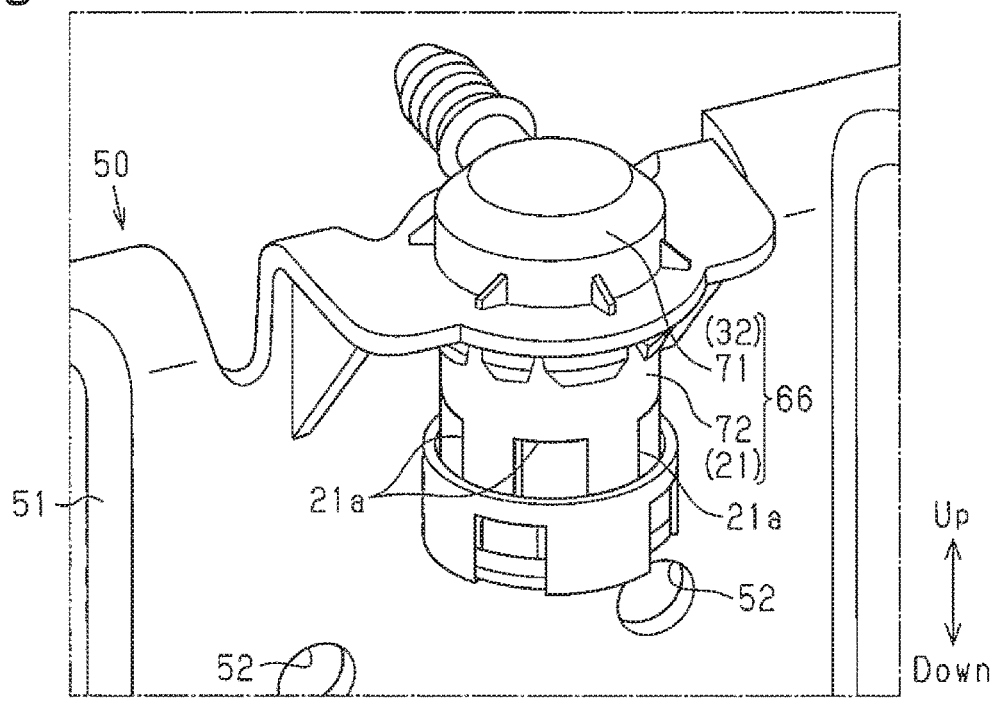
FIG. 12 is a partial perspective view illustrating a state in which the mounted portion of the fuel shut-off valve is mounted on the mounting portion of the baffle plate according to the fifth embodiment.

In the following, a fifth embodiment of the mounting structure of a fuel device will be described with reference to FIGS. 11 and 12.

In the fifth embodiment, among the components of the fuel shut-off valve 66, the mounting portion 67 and the mounted portion 68 of the fourth embodiment are replaced with a mounting portion 71 and a mounted portion 72 with a different configuration. The mounting portion 71, more specifically, the cover 32 is integrally formed, as a part of the baffle plate 50, with the baffle plate 50 on the body wall 51. The remaining components of the fuel shut-off valve 66 are mounted as the mounted portion 72 on the mounting portion 71. This mounting may be made by engaging an engaging protrusion with an engaging hole in the same manner as in the first embodiment.

Other than the above-mentioned configuration, the fifth embodiment has the same structure as in the fourth embodiment. Identical reference numerals are given to the components described in the fourth embodiment and redundant description is omitted herein.

In the fifth embodiment, the mounting portion 71 and the mounted portion 72 are different from the mounting portion 67 and the mounted portion 68 in the fourth embodiment. However, the fifth embodiment has a feature in common with the fourth embodiment in that the mounted portion 72 of the fuel shut-off valve 66 is mounted on the mounting portion 71 integrally formed with the baffle plate 50. Thus, unlike Japanese Laid-Open Patent Publication No. 2006-264372, the fifth embodiment eliminates the mounting work of the fuel shut-off valve on the holding unit arranged on the baffle plate, thereby providing advantages of further improving the efficiency of the overall mounting work.

Sixth Embodiment

Figure 13:
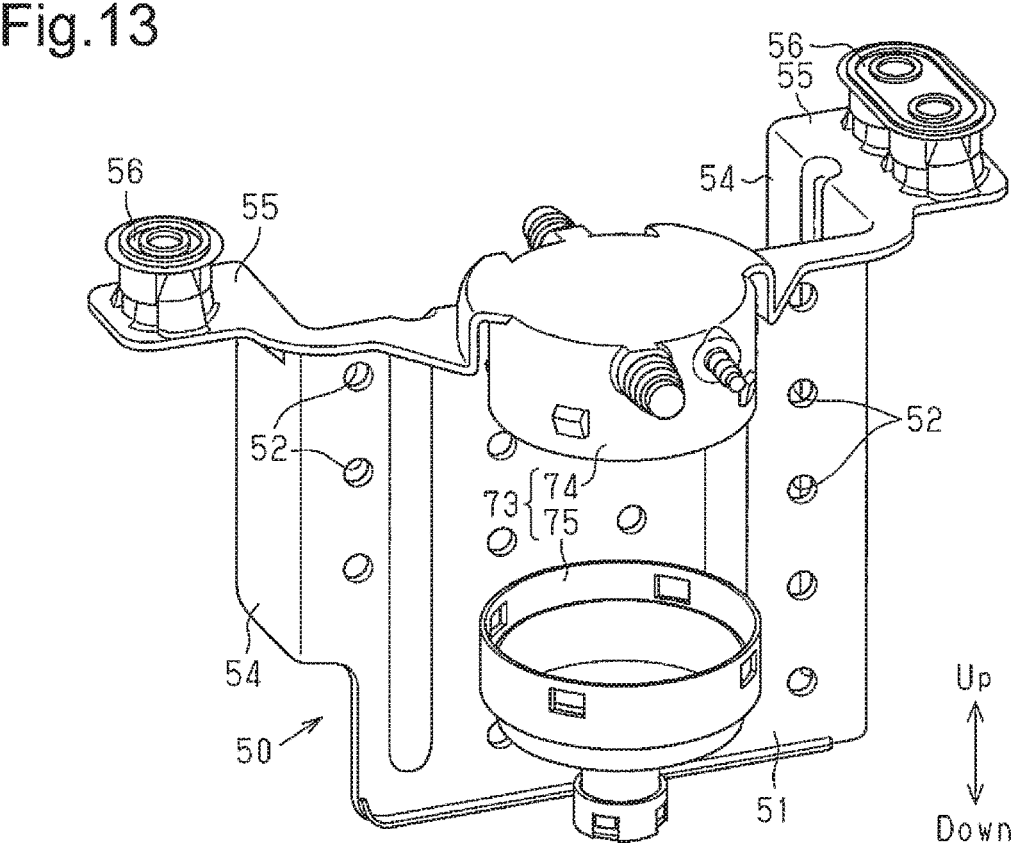
FIG. 13 is an exploded perspective view illustrating a state before a mounted portion of a gas-liquid separator is mounted on a mounting portion of a baffle plate according to a sixth embodiment.
Figure 14:
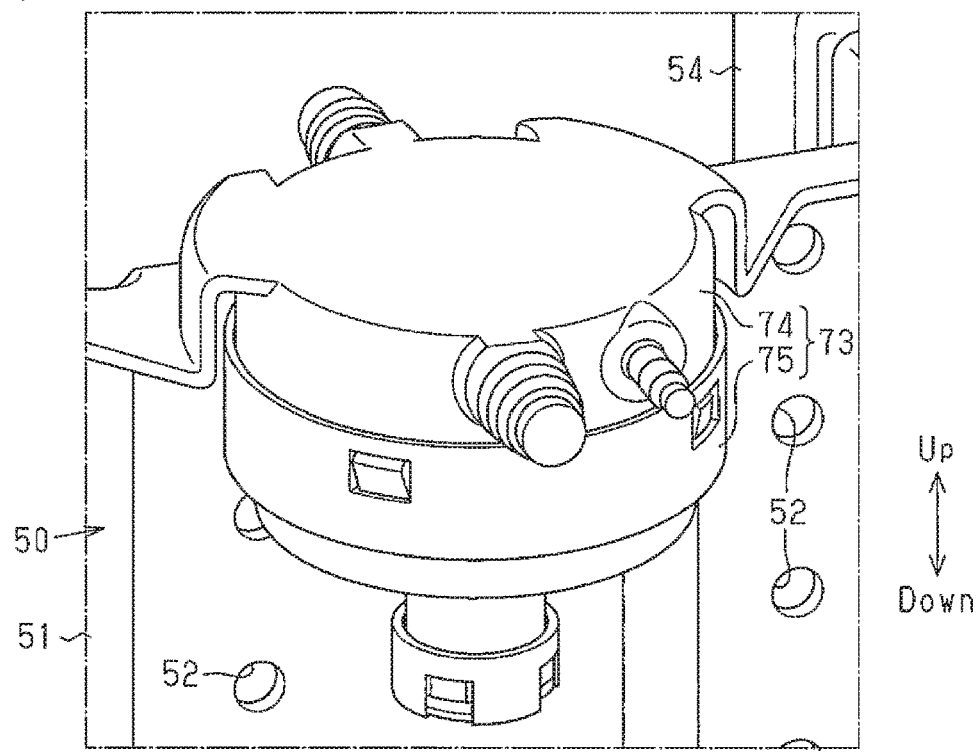
FIG. 14 is a partial perspective view illustrating a state in which the mounted portion of the gas-liquid separator is mounted on the mounting portion of the baffle plate according to the sixth embodiment.

In the following, a sixth embodiment of the mounting structure of a fuel device will be described with reference to FIGS. 13 and 14.

The sixth embodiment employs, instead of the above fuel shut-off valve 13 or 66, a gas-liquid separator 73 as the fuel device. The gas-liquid separator 73 is arranged between the fuel tank 11 and the canister 10. The gas-liquid separator 73 is a device for allowing gas communication between the fuel tank 11 and the canister 10 while preventing liquid fuel in the fuel tank 11 from flowing into the canister 10. The gas-liquid separator 73 is configured by assembling a plurality of components. One of the components of the gas-liquid separator 73 is configured to be a mounting portion 74. This mounting portion 74 is integrally formed, as a part of the baffle plate 50, with the baffle plate 50 on the body wall 51. The remaining components of the gas-liquid separator 73 are mounted as a mounted portion 75 on the mounting portion 74. This mounting may be made by engaging an engaging protrusion with an engaging hole in the same manner as in the first embodiment.

Other than the above-mentioned configuration, the sixth embodiment has the same structure as in the first embodiment. Identical reference numerals are given to the components described in the first embodiment and redundant description is omitted herein.

In the sixth embodiment, the fuel shut-off valve 13 in the first embodiment is replaced with the gas-liquid separator 73 to serve as the fuel device. However, the sixth embodiment has a feature in common with the first embodiment in that the mounted portion 75 of the gas-liquid separator 73 is mounted on the mounting portion 74 integrally formed with the baffle plate 50. Thus, unlike Japanese Laid-Open Patent Publication No. 2006-264372, the sixth embodiment eliminates the mounting work of the gas-liquid separator on the holding unit arranged on the baffle plate, thereby providing advantages of further improving the efficiency of the overall mounting work.

Modifications

The above-mentioned embodiment may be modified as follows.

Figure 15:
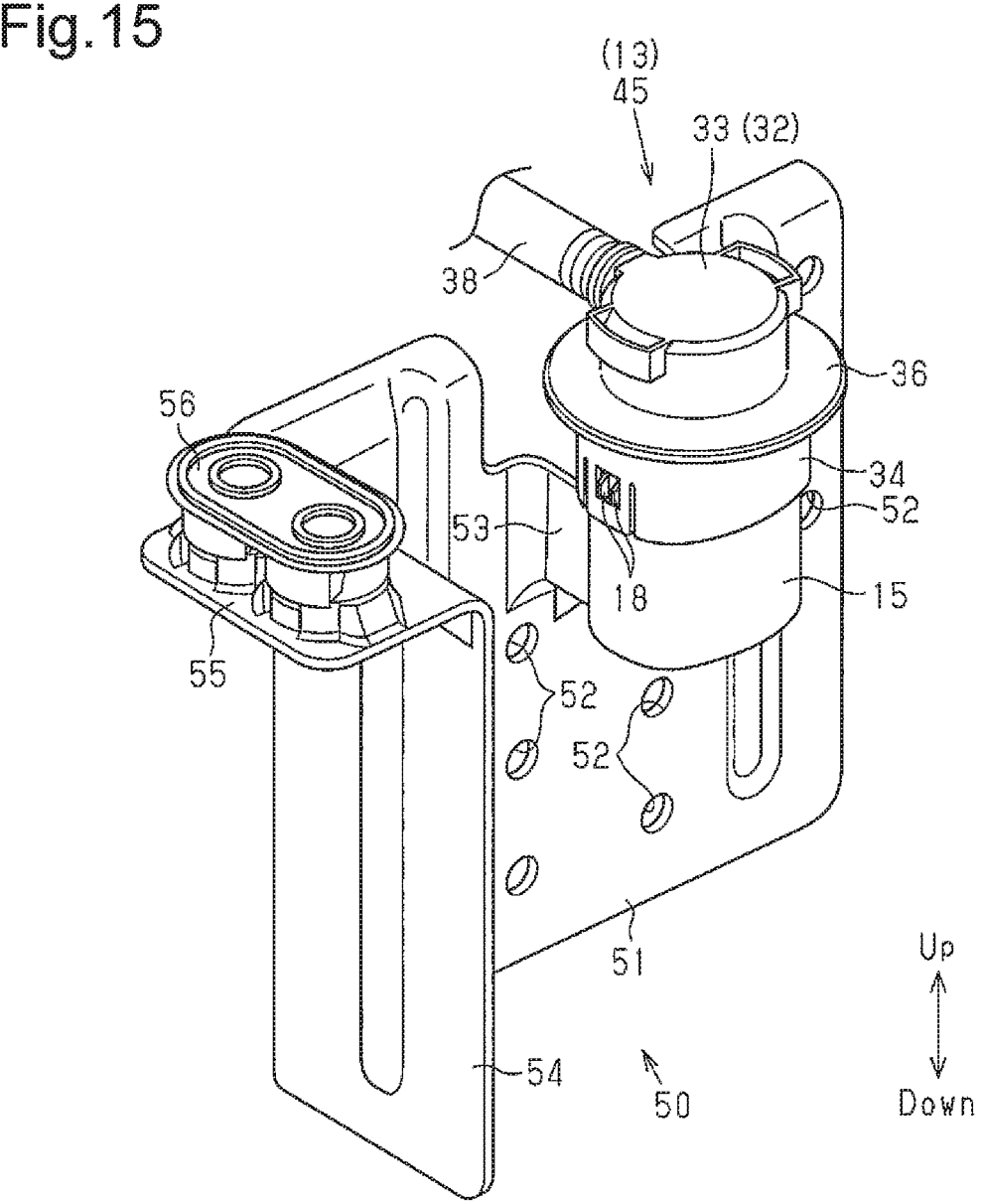
FIG. 15 is a partial perspective view illustrating a modification of the first embodiment, showing a state in which a mounted portion of a fuel shut-off valve is mounted on a mounting portion (outer housing member) of a baffle plate.

As shown in FIG. 15, one of the side walls 54 on the baffle plate 50 in the first embodiment may be removed. Even in this case, the single side wall 54 and the body wall 51 on two sides still surround a mounting portion (outer housing member 15). Thus, this structure stabilizes the liquid surface of liquid fuel and improves the accuracy of the detection of a full tank in comparison with a case where the side walls 54 are both removed.

Further, both of the side walls 54 may be removed (not shown). Even in this case, the body wall 51 in proximity to the mounting portion (outer housing member 15) stabilizes the liquid surface of liquid fuel and improves the accuracy of the detection of a full tank in comparison with a case where the mounting portion (outer housing member 15) is arranged at a location far away from the body wall 51.

The fuel shut-off valve may have one or both of the function of a full-tank detection valve and the function of a cutoff valve.

For mounting the mounted portion on the mounting portion, an engaging structure other than the described engaging structure for engaging an engaging protrusion with an engaging hole may be used.

The baffle plate 50 may be fixed within the fuel tank 11 via a fixation method such as fitting instead of welding.

In the fourth embodiment and the fifth embodiment, the inner housing member 21 may be integrally formed, as a mounting portion, with the baffle plate 50.

The invention claimed is:

1. A fuel device assembly comprising a fuel shut-off valve and a baffle plate for suppressing waving of liquid fuel stored in a fuel tank, wherein
the fuel shut-off valve comprises a plurality of components,
one of the plurality of components of the fuel shut-off valve is integrally formed, as a mounting portion, with the baffle plate,
remaining components of the plurality of components of the fuel shut-off valve are mounted, as a mounted portion, on the mounting portion of the baffle plate,
the baffle plate includes
a flat body wall for suppressing waving of the liquid fuel,
the one of the plurality of components that is the mounting portion, and
a connector for connecting the body wall to the one of the plurality of components that is the mounting portion,
the one of the plurality of components that is the mounting portion is arranged at a location spaced from the body wall in a thickness direction of the body wall,
the fuel shut-off valve includes a housing having a communication opening in communication with a canister and includes a float valve arranged within the housing and floating on the liquid fuel so as to open and close the communication opening by vertically moving in accordance with fluctuation of a liquid surface,
the housing includes an inner housing member and an outer housing member,
at least a part of the float valve is arranged within the inner housing member,
at least a part of the inner housing member is arranged within the outer housing member,
the outer housing member extends in a vertical direction and has a lower opening at a lower end,
the outer housing member is integrally formed, as the mounting portion, with the baffle plate,
the fuel shut-off valve detects that the fuel tank is filled with the liquid fuel when gas pressure in the fuel tank rises after the liquid surface of the liquid fuel in the fuel tank reaches the lower opening, and
the fuel shut-off valve is configured such that, after the liquid surface of the liquid fuel in the fuel tank rises to the lower opening, a pressure difference is generated between a gaseous phase part of the fuel tank and a gaseous phase part in the inner housing member so that a liquid surface of the liquid fuel in the inner housing member rises and becomes higher than the liquid surface of the liquid fuel in the fuel tank, thereby moving the float valve to close the communication opening to allow a liquid level of the liquid fuel when the fuel tank is full to be substantially the same height position as the lower opening.

2. The fuel device assembly according to claim 1, wherein
the fuel shut-off valve includes a cover for covering the housing from above and constituting a part of the mounted portion,
the cover includes a lower tubular portion extending in the vertical direction and being attached to the outer housing member from above,
the outer housing member includes an engaging portion,
the lower tubular portion includes an engaged portion to be engaged with the engaging portion, and
the mounted portion of the fuel shut-off valve is mounted on the mounting portion of the baffle plate by engaging the engaging portion with the engaged portion.

3. The fuel device assembly according to claim 2, wherein the baffle plate includes at least one side wall extending from the body wall so as to face the outer housing member, the at least one side wall is spaced from the outer housing member, and the baffle plate surrounds the outer housing member by the body wall and the at least one side wall.

4. The fuel device assembly according to claim 3, wherein
the at least one side wall has two side walls, and
the two side walls are located such that the outer housing member is arranged therebetween.

5. The fuel device assembly according to claim 1, wherein the mounting portion integrally formed with the baffle plate is an integrated bottom.

6. The fuel device assembly according to claim 1, wherein the mounting portion integrally formed with the baffle plate is a cover.

* * * * *